Dec. 7, 1971  M. S. MERRILL  3,625,081
APPARATUS FOR DETECTING UNBALANCE OF VEHICLE WHEELS
Filed April 1, 1969  3 Sheets-Sheet 2
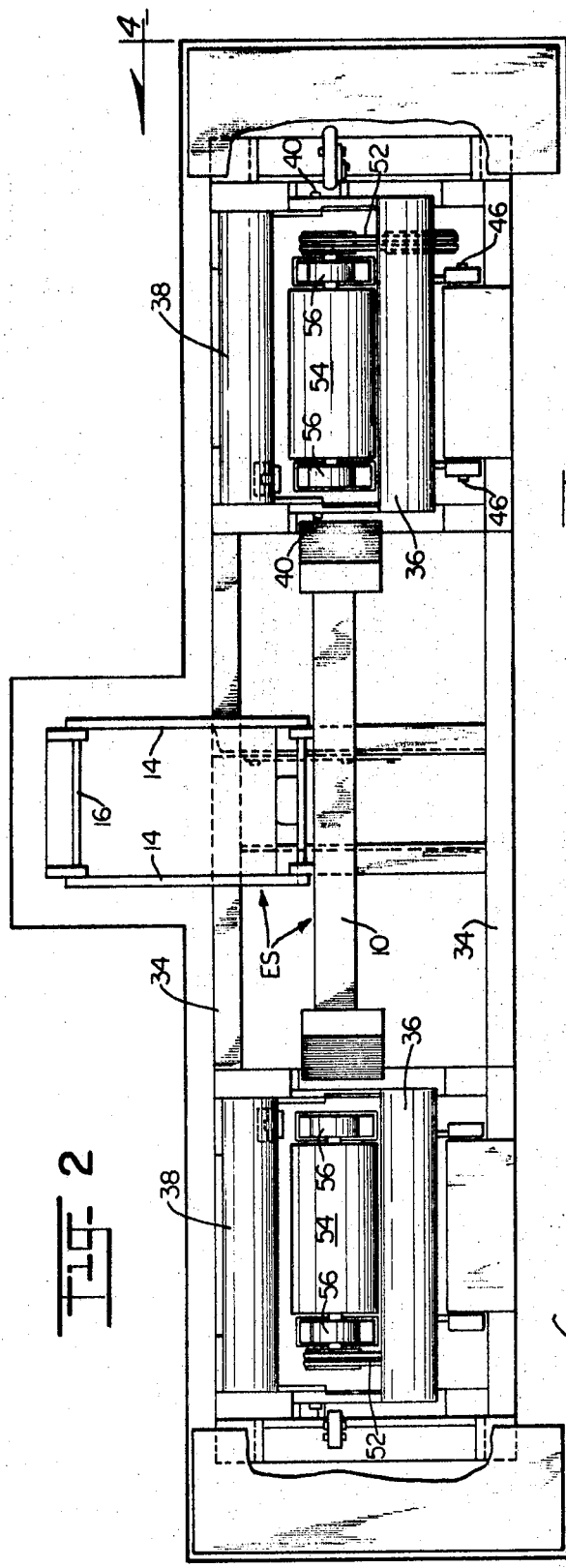
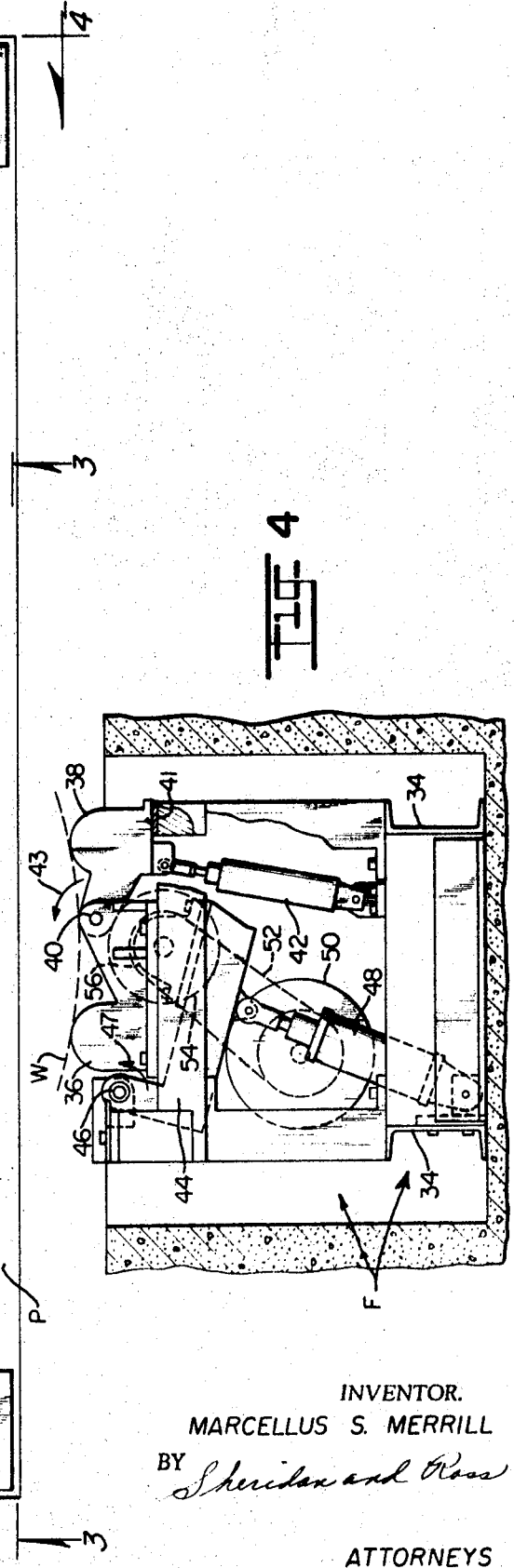
INVENTOR.
MARCELLUS S. MERRILL
BY *Sheridan and Ross*
ATTORNEYS

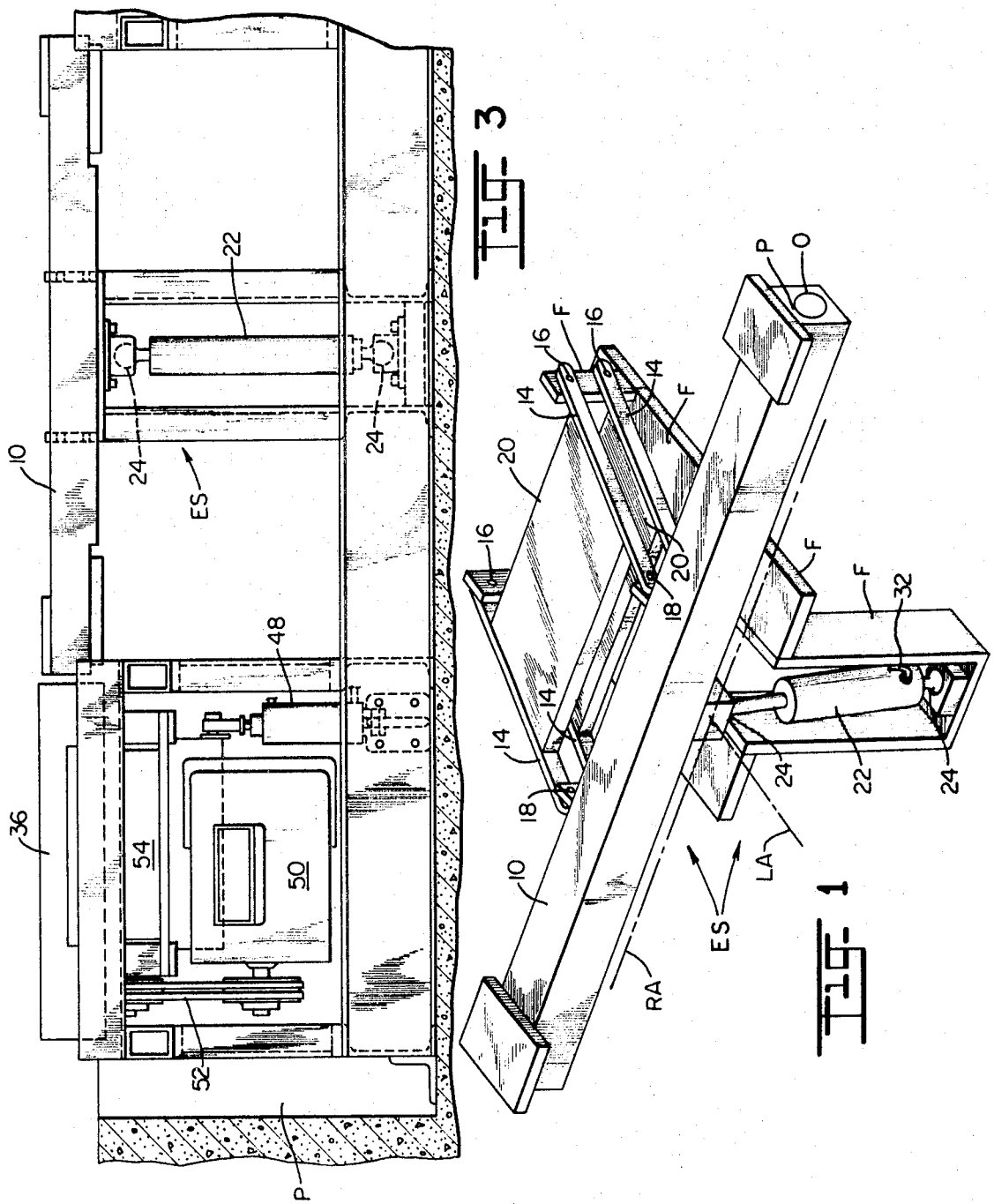

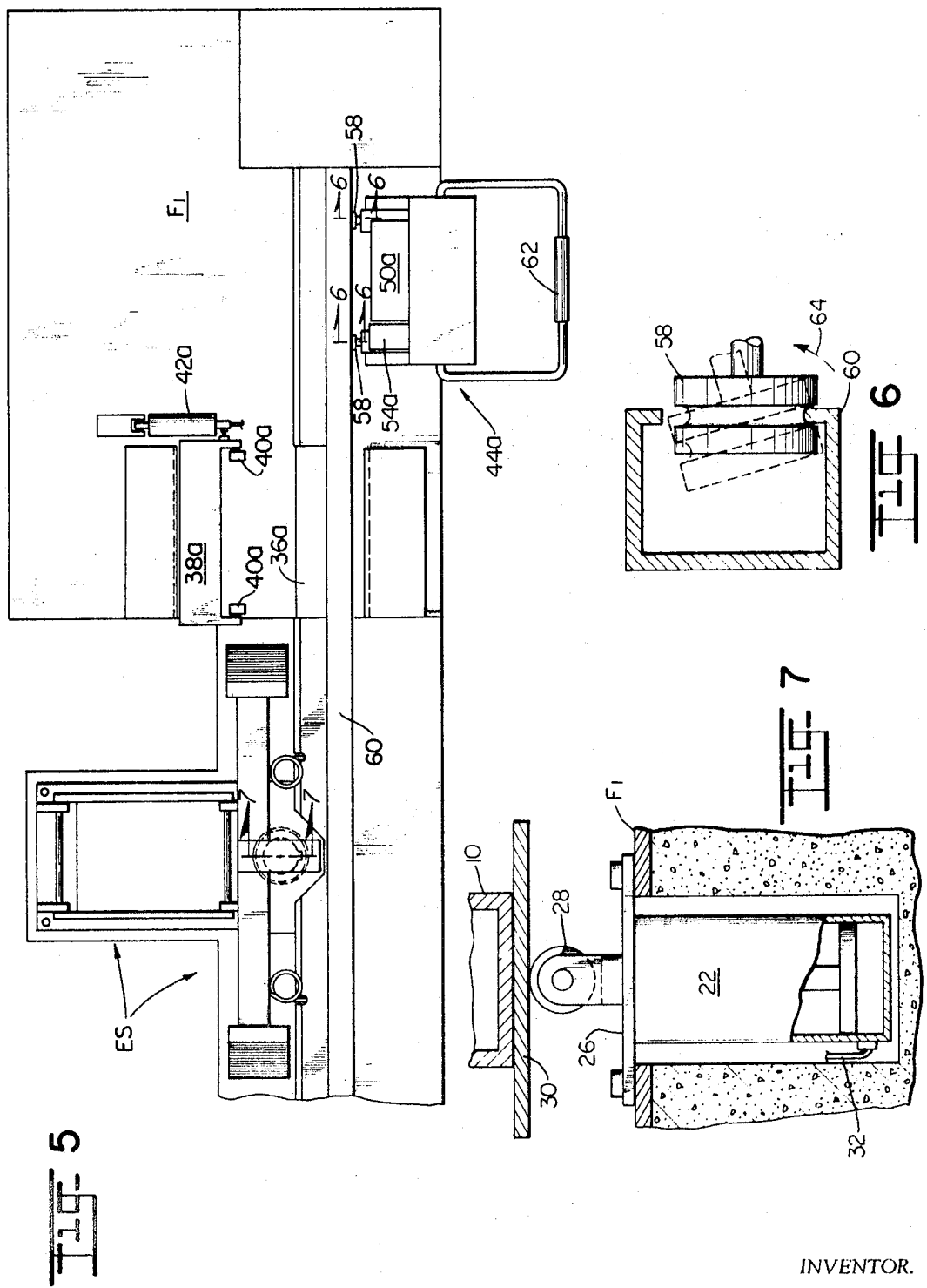

United States Patent Office 3,625,081
Patented Dec. 7, 1971

3,625,081
APPARATUS FOR DETECTING UNBALANCE OF VEHICLE WHEELS
Marcellus S. Merrill, 335 Colorado Blvd., Denver, Colo. 80236
Filed Apr. 1, 1969, Ser. No. 811,727
Int. Cl. G01m 1/28
U.S. Cl. 73—457                                14 Claims

ABSTRACT OF THE DISCLOSURE

Apparatus for detecting rotary unbalance of automotive vehicle wheels in situ characterized by an improved elevating and supporting beam which may oscillate about its midpoint with equal amplitudes of oscillation of its ends, permitting a single vibration pick-up to be employed at only one end of the beam and also establishing a known phase relationship between the detected magnitude of unbalance and the actual position of unbalance. Wheel spin speed may be lower than conventional spin speed through a critical speed where resonance occurs which permits use of relatively low constant speed sparkless motors conforming to safety requirements to obviate fire and explosion hazards near floor level. The foregoing apparatus is common to two versions, one being a pit mount requiring extensive floor excavation and the other a floor mount requiring a minimum of excavation. Pairs of chocks are employed to locate companion wheels in predetermined position relative to the beam and one chock of each pair is movable to perform the additional function of arresting rotation of a wheel.

BACKGROUND OF THE INVENTION

It has long been recognized that the wheels of an automotive vehicle should be maintained in proper balance to render it safe to operate and also minimize abnormal tire and other detrimental wear of the automotive suspension system, such as bearings, and other movable mechanical parts, which results principally from rotating unbalance forces. Various devices have long been in use which detect the unbalance condition in situ with a wheel rotating on its normal bearings which has generally been considered the more satisfactory procedure since it obviated the labor of removing a wheel from the vehicle and also detecting its unbalance under only simulated conditions.

As understood in the art of balancing rotating masses, the rotating unbalance forces referred to are kinetic and dynamic. Kinetic is briefly defined as the contrifugal force of "static" unbalance of a single mass rotating in a single plane while dynamic is the force which results from two masses angularly related and disposed in parallel planes. Thus, if the plane of rotation of a vehicle wheel be considered as the vertical central plane between the sides of the tire, the unbalance mass could lie in this plane (kinetic) or comprise masses at each side of this plane (dynamic), or both. As a practical matter corrective weights were added only to the wheel rim edges which are disposed laterally of the defined plane. It thus becomes apparent that a kinetic unbalance may be approximately corrected by the addition of weight to the wheel rim but this does not necessarily correct for dynamic unbalance. The correction for kinetic balance will usually correct for the major portion of the disturbing unbalance forces. After this correction is made it will then be known that any remaining unbalance is dynamic rather than kinetic which latter is then corrected, usually requiring some trial and error of applying a pair of angularly related weights to opposite edges of the rim. In general, however, the critical or resonant frequency of kinetic unbalance occurs at a frequency or speed of wheel rotation which is lower than the critical frequency of dynamic unbalance hence the skilled operator can distinguish between dynamic and kinetic by observation of the pick-up signals. Thus, a common procedure is to spin a wheel to desired speed, detect the magnitude of kinetic unbalance by a vibration pick-up which is coupled, for example, to a stroboscopic light which illuminates a reference point on the wheel once each revolution and from which the point of unbalance may be determined from a known or estimated angular phase difference which exists therebetween. Kinetic unbalance is then corrected which will usually correct the major portion of the disturbing force after which the operation is repeated to detect remaining dynamic unbalance which is then corrected if it is objectionable magnitude. Since the maximum signal for dynamic unbalance may be relatively small after correction for kinetic unbalance, this signal may be considerably amplified, if desired, to produce a meter reading signal at which the maximum may be more readily detected.

The U.S. Patent to Merrill et al., 2,798,379, exemplifies a device of the type referred to which is of somewhat elaborate nature and intended principally for production line use where its continuous use will justify its greater complexity and cost. The U.S. Patent to Merrill et al., 3,164,994, exemplifies a more simplified type of device, the cost of which can better be justified by the less frequent use, such as, in service stations, tire retail stores and the like. The present invention is more closely related to Pat. 3,164,994 and carries forward certain of its general concepts with mechanical variations which have been found to effect improvements of operation.

In the patent just referred to, a wheel is spun through a critical speed and allowed to coast to critical speed where resonance produces a maximum signal of unbalance, this speed being relatively high and usually in excess of normal maximum highway speeds of 60–76 m.p.h.

Such speed was entirely feasible with a brush-type high speed commutator electric motor, however, certain recent safety requirements dictate that certain sparking type electric motors may not be employed within certain distances from a floor where explosion or fire hazards exist. Totally enclosed motors of this type are, of course, known but they are usually more bulky, because of difficulty of cooling, and expensive. The three-phase sparkless induction motor, thus, became a desired choice if it could be incorporated to give the required spin speed. As is well known, the minimum number of poles of a motor is two, which if operating synchronous on 60 cycle electrical supply operates at 3600 r.p.m. One of the problems thus involved utilization of such a low speed motor, as compared to motors heretofore employed and using a friction tire engaging drive pulley or speed changer which could be conveniently incorporated within spacial availability. As will subsequently appear, the spinner pulley or roller drive of this invention was so designed to yield a wheel spin speed which was less than the former critical speed but by use of a more sensitive type of pick-up (which forms no part of the invention per se) a signal of acceptable magnitude, with economical circuitry, could be produced with a known phase relation between it and the stroboscopic light so that the approximate point of unbalance, where weight was to be added, was known.

The Merrill et al Patent 3,164,994 was designed strictly as a floor mount machine which required no floor excavation for any of its parts. In order to attain this end it was necessary to locate its beam elevating ram entirely above the floor level which resulted in a beam torsionally supported about remote points and without any vertical support directly under the midpoint of the beam. This usually required a pick-up at each end of the beam. In the present invention, with the sacrifice of the inconvenience of a minor floor excavation, the ram is now located directly under the center of the beam which oscillates with equal amplitude about the point of support, thus permitting the elimination of one of the pickups and simplification of the electrical circuitry. The desirability of both a floor mount and a pit mount incorporating this redesigned lifting beam has been recognized and incorporated in two versions of the apparatus, one being a floor mount with minor excavation and the other a pit mount requiring considerable floor excavation. The economy of a single spinner for both wheels, as in Merrill et al. 3,164,994 has been retained in the floor mount, however, in the pit mount separate spinners are provided to thus obviate the inconvenience of transporting the spinner between companion wheels.

The principal background of the invention is therefore, in summary, Merrill et al. 3,164,994 with certain modifications which have been found to be of advantage and which modifications form the prinicpal objects of the present invention all as will more fully appear from the detailed description to follow and the appended claims.

BRIEF DESCRIPTION OF THE DRAWING

FIG. 1 is an isometric view of vehicle lifting and support apparatus which is a common component employed in both the pit mount and floor mount versions of the invention;

FIG. 2 is a top plan of the pit mount version;

FIG. 3 is a front elevation of a portion of same, as viewed along line 3—3, FIG. 2;

FIG. 4 is an end elevation of same as viewed along line 4—4, FIG. 2;

FIG. 5 is a top plan of the floor mount version, a portion of one end being omitted;

FIG. 6 is a section taken on line 6—6, FIG. 5; and

FIG. 7 is a section taken on line 7—7, FIG. 5.

DESCRIPTION OF THE PREFERRED EMBODIMENTS

Referring now to the drawing, and first to FIG. 1, the vehicle elevating and support apparatus ES comprises a beam 10, connected to frame F by two pairs of links 14, 14, the rear ends of which are connected to the frame by pivot pins 16 and the forward ends connected to the beam by like pairs of pivot pins 18, 18. The links are all of the same length and the vertical distance between pivot points at their front and rear ends is the same to thus provide a parallelogram linkage which constrains the beam to swing upwardly about the rear pivot pins but maintains its top surface parallel in horizontal planes in all positions of lifting movement in the same manner as disclosed in Merrill Patent 3,164,994. Opposite lateral edges of each of plates 20, 20 are welded to the upper and lower pairs of links to stiffen the linkage system.

An upwardly extensible but rigid lifting device such as a hydraulic ram 22, engages the beam at its midpoint so that a reference point P on each end of the beam may move in an orbit O (FIG. 1) substantially about the intersection of a beam reference axis RA and longitudinal axis LA. As will be apparent, these orbits are the same due to the rigidity of the beam but are opposite in phase, that is, an upward vertical component of movement at one end has a like corresponding downward component of movement at the other end. This differs fundamentally from Merrill Patent 3,164,994 in that the opposite orbital paths of movement of points P at each end of the beam are substantially the same and of substantially equal magnitude and the orbital or gyratory movement of the beam is about a known locus rather than an unknown locus.

As best illustrated in FIGS. 1 and 3, the upper and lower ends of the ram are preferably connected to the frame and beam by ball joints 24, 24 in the pit mount version where the frame is anchored to the bottom of a pit P and the considerable floor excavation readily permits this type of connection due to spacial availability. In the floor mount version, however, where minimum floor excavation is desired and framework extending into the excavation is, thus, to be preferably avoided, the construction may be as illustrated in FIG. 7 wherein ram 22 is rigidly affixed to frame $F_1$ by a flange 26, the ram carrying a roller 28 which rolls along a plate 30 affixed to the lower surface of beam 10. In this construction the ram moves along a fixed vertical axis whereas in the pit mount it moves along an axis which swings slightly from the vertical. In either case, however, the movement of the ram is substantially vertical so that the load on the center of the beam is carried to the frame along a substantially vertical axis. It will, of course, be apparent that if it is desired to slightly increase the floor excavation to the floor mount version and provide a frame extending from the floor to a point beneath the ram, ball joints may be employed in the construction shown in FIG. 7 in the same manner as disclosed in FIGS. 1 and 3. The lower end of the ram in either version communicates with a suitable source of high pressure liquid through a conduit 32. Normally a single acting hydraulic ram may be employed, and upon release of fluid pressure the weight of the linkage system and beam will be sufficient to permit it to clear the wheel suspension of the vehicle. It is to be understood, however, that return springs may be employed to aid in lowering of the beam or the lifting cylinder may be double acting to provide positive powered return to its lowermost position.

Referring now to FIGS. 2 and 4, frame F of the pit mount comprises all fixed structure which supports the various movable and functional parts of the apparatus and includes channel members 34 affixed to the floor of the pit, and various other structural members affixed to same. Frame F supports, adjacent each end of beam 10, apparatus for positioning companion wheels of a vehicle in predetermined position relative to beam 10, means for spinning a wheel to desired speed after being elevated and means for arresting rotation of same while in its elevated position which will now be described for one side only since both sides are identical except for having right and left hand arrangement of parts. As best shown in FIG. 4, a front chock 36 is rigidly affixed to the frame F and a rear chock 38 is pivotatlly secured to the front chock or to the frame by aligned pivot pins 40, 40. Chock 38, when in its lowered position, as shown, rests on a suitable abutment 41 on the frame and the two chocks provide a generally V-shaped support onto which the companion vehicle wheels W may be disposed thus to place the wheels in a predetermined position relative to the beam. In this position, the ends of the beam will be disposed beneath the opposite A frame knee action supports of a vehicle or directly beneath the rear axle housing. The axis of the beam is thus disposed substantially in a vertical plane passing through the companion wheel axes. An air actuator 42 is pivotally connected at opposite ends to the frame and chock 38 so that when extended the chock swings about pivots 40 as indicated by arrow 43. A spinner carriage 44 is pivotally connected to frame F by a pivot pin 46 and may swing upwardly, as indicated by arrow 47 or by a similar air cylinder 48. An electric motor 50 is affixed to the carriage and connected by V belts 52 to a spinner roll 54 journaled for rotation on carriage 44 by journals 56 adjacent opposite ends of the spinner roll.

In the operation of the pit mount version the front companion wheels of a vehicle are positioned on chocks 36, 38, the upper surface of which are convexed so that the wheels will readily roll over same and position the vehicle in a predetermined position. Beam 10 is then elevated, raising the wheels above the chocks. Cylinder 48 is then actuated raising spinner roll 54 into contact with the periphery of the vehicle tire and motor 50 energized to rotate the wheel to desired speed. The unbalance of the wheel is then detected by a vibration sensitive pick-up carried by one end of the beam. Any suitable type of pickup may be employed with senses movement only along a single plane. Thus, if the maximum amplitude of movement of point P on an end of the beam is to be detected, the pick-up would sense only the vertical components of point P as it moves about orbit O. This is generally to be preferred since the maximum signal will usually be the greatest in this direction. It is to be understood, however, that the signal may be detected in any other plane, such as horizontal, if so desired. A pickup in its most simple form would embody a flat spring which may vibrate only in a plane perpendicular to its plane, the spring carrying a magnet oscillatable along an axis of a pick-up coil. As will be apparent, by suitable angular orientation of the plane of the spring the amplitude of vibration at any plane of orbit O may be detected. Since a specific pick-up forms no part, per se, of the present invention, and pick-ups of the general type referred to are conventional in the art, illustration and detailed description of same has been omitted in the interests of simplification of the description. Chock 38 is then raised into contact with the tire, arresting rotation of the wheel and if correction of the unbalance is desired at this time, rather than merely detection of magnitude of unbalance, this is next performed. The same procedure is then repeated for the companion wheel. As will be understood, one wheel remains stationary while unbalance detection is being performed for the companion rotating wheel. Upon completion of the operation, beam 10 is lowered, permitting the vehicle to be driven or otherwise moved from its position on the chocks.

Referring now to FIGS. 5 and 6, the floor mount version performs the identical functions of the pit mount but differs somewhat in construction. Front fixed chock 36a is essentially the same as chock 36 and rear chock 38a is pivoted to the frame by pivots 40a, 40a, the rear chock 38a being elevated by an air actuator 42a which is disposed above frame F₁ rather than beneath the chock as illustrated in FIG. 4. In the floor mount version for reasion for reasons of economy, only a single spinning carriage is provided which may be selectively moved to positions adjacent the companion wheels similar to the construction disclosed in Merrill Patent 3,164,994. This structure comprises a carriage 44a, having an electric motor 50a directly connected to a spinner roll 54a, the carriage being supported by a pair of grooved rolls 58 which may roll along a rail or guideway 60. A handle 62 is affixed to the carriage and permits the operator to swing it upwardly about rolls 58 as indicated by arrow 64 to engage spinner roll 54a with the tire.

The operation of the invention, as so far described, has pertained principally to the detection of unbalance of front wheels which may be spun independently by a spinner roll. The detection of unbalance of rear wheels, connected by a differential is, of course, also within the purview of the invention, the principal difference being that the beam 10 may be provided with elevatable saddles which engage the axle housings on each side of the differential housing and the wheels rotated by engine power rather than spinner rolls. As will be apparent, if both wheels are rotated at the same speed the pick-up will detect the unbalance resulting from a dynamic couple, indicating that an unbalance condition exists which requires correction. If rotation of one wheel is arrested by a chock, however, the magnitude of unbalance of the rotating wheel may be detected in the same manner as for a front wheel.

Since the wheel speeds do not have to pass through resonance, as heretofore, it will be apparent that the pickup may be of any desired type so long as it will sense an acceptable signal at some predetermined lower wheel speed. A further preferred characteristic is that the phase relation between the detected point of unbalance by stroboscopic means and the actual point of unbalance remain substantially constant with variable amplitude of unbalance.

While not illustrated, it will become apparent, that by provision of suitable sequencing switches or the like, the various sequential functions may be performed automatically thus enhancing speed and accuracy of operation where this is desired in factory or service station use of the invention.

Obviously many modifications and variations of the present invention are possible in the light of the above teachings. It is therefore to be understood that within the scope of the appended claims the invention may be practiced otherwise than as specifically described.

I claim:

1. Apparatus for detecting the unbalance of a pair of companion wheels supporting one end of an automotive vehicle, at opposite sides of a longitudinal vehicle reference axis comprising:
    (a) an elongated platelike frame adapted to be secured to the surface of a floor and extending beneath said wheels,
    (b) a rigid beam extending transverse of the vehicle axis having opposite free ends for engaging opposite sides of the vehicle suspension system, and means pivotally connecting same to the frame,
    (c) a cylinder rigidly affixed to said frame having a portion extending therebelow into an excavation in the floor and a ram rectilinearly movable therein in a vertical direction,
    (d) means slidably connecting the upper end of the ram to the center of the beam, whereby the upper end of the ram may slide relative thereto as the beam pivots,
    (e) the pivotal connection of the beam to the frame being such that the ends of the beam may gyrate in orbits about the upper end of the ram,
    (f) a pair of spaced chocks carried by the frame adjacent each end thereof for locating the wheels relative to the beam,
    (g) one of each pair of spaced chocks being mounted for pivotal movement to brake a wheel while in lifted position,
    (h) means for spinning the wheels comprising a carriage movable across the frame and having a roller selectively engageable with each wheel, and
    (i) a sparkless three-phase, two-pole electric motor directly connected to the roller, to thereby minimize the diameter of the roller to obtain a desired peripheral speed thereof.

2. Apparatus for individually detecting rotary unbalance forces of one of a pair of companion wheels supporting one end of an automotive vehicle at opposite ends of a longitudinal vehicle reference axis, each wheel being carried by a suspension member movable relative to the frame of the vehicle and resiliently supporting same, comprising:
    (a) a rigid beam extending transversely of the vehicle reference axis having opposite free ends, each free end being constructed so as to support a corresponding one of said suspension members;
    (b) an extensible rigid lifting member mounted directly beneath said rigid beam and having an upper end that engages said rigid beam at a locus substantially midway between the free ends of the rigid beam for elevating and supporting the rigid beam in a manner such that the free ends of the rigid beam are allowed to gyrate in like, but opposite, substantially equal amplitude orbits about said locus in response to any unbalance forces generated when said rigid beam is raised and either of said wheels is rotated;
    (c) means for preventing, upon the elevation of said rigid beam, the rotation of said rigid beam about its longitudinal axis; and
    (d) a single vibration responsive means carried by said rigid beam on one side of said locus for detecting, along a selected plane, the amplitude movements of the beam caused by the kinetic and dynamic unbalance of either of said wheels upon rotation thereof.

3. Apparatus in accordance with claim 2 wherein said selected plane is a vertical plane.

4. Apparatus in accordance with claim 2 including:
(a) a frame adapted to be secured to a rigid support and to which said lifting member is secured,
(b) means for locating the wheels relative to the beam before lifting same,
(c) means carried by the frame for selectively spinning each wheel, and
(d) means carried by the frame for selectively braking each wheel.

5. Apparatus in accordance with claim 4 wherein said means for locating each wheel comprises a pair of spaced chocks, and means for pivotally moving one of said chocks, after a wheel has been lifted, to contact and brake same against rotation.

6. Apparatus in accordance with claim 5 wherein said means for spinning each wheel comprises a rotatable roller adapted to be moved upwardly between the chocks.

7. Apparatus in accordance with claim 4 wherein the entire frame is adapted to be disposed above the surface of a floor and said rigid lifting member comprises a hydraulic actuator affixed to the frame having a portion extending below the floor, whereby excavation of the floor is required only for the portion aforesaid.

8. Apparatus in accordance with claim 7 wherein said actuator comprises a cylinder rigidly affixed to the frame, and a ram movable relative thereto, the upper end of the ram being slidably connected to the beam, and the beam being pivotally mounted to the frame, whereby the upper end of the ram, during its rectilinear movement, may slide relative to the beam as it pivotally moves.

9. Apparatus in accordance with claim 4 wherein the entire frame is so constructed to be disposed in a pit below the surface of a floor.

10. Apparatus in accordance with claim 4 wherein the means for spinning each wheel includes a sparkless three-phase motor and a wheel engaging roller rotated by same.

11. Apparatus in accordance with claim 10 wherein the motor is of the two pole type, to thereby minimize the diameter of the roller to obtain a desired peripheral speed thereof.

12. Apparatus for individually detecting rotary unbalance forces of one of a pair of companion wheels supporting one end of an automotive vehicle at opposite sides of a longitudinal vehicle reference axis, each wheel being carried by a suspension member movable relative to the frame of the vehicle and resiliently supporting same, comprising:
(a) a rigid beam extending transversely of the vehicle reference axis having oppositely extending like cantilevered arms, each having a free end adapted to support a suspension member;
(b) elevating means located beneath the rigid beam and engaging the rigid beam substantially at its midpoint for moving the rigid beam from a lowered position to an elevated position at which the wheels are free to spin;
(c) said elevating means being constructed so as to provide a central point about which said free ends may gyrate;
(d) constraining means for constraining the rigid beam to move in a desired path between its lowered and elevated positions;
(e) spinning means for selectively spinning either wheel so as to produce an unbalance force on the rigid beam when said spinning wheel is unbalanced, said unbalance force causing both of said free ends to move in like orbits of substantially the same amplitude; and,
(f) vibration responsive means carried by one of said arms on one side of said central point of said rigid beam for detecting, along a selected plane, the amplitude of the unbalance force caused by said spinning wheel.

13. Apparatus in accordance with claim 12 wherein said arms are of a length to dispose their ends beneath the front knee action suspension of the vehicle.

14. Apparatus for selectively detecting the rotary unbalance forces of each of a pair of companion wheels both supporting one end of an automotive vehicle with an individual wheel suspension for each wheel, comprising:
a substantially rigid beam extending between the wheels and having opposite free ends with each free end supporting an individual wheel suspension;
a lift supporting the beam at a position between its free ends so that each free end of the beam is free to gyrate in a like, but out of phase, path about said position relative to the path of the other free end to affect relatively equal, but out of phase, amplitude movements of the free ends in response to the unbalance forces generated by each wheel of the pair when it is individually rotated;
rotating means for selectively rotating either wheel; and,
a single vibration detector mechanically coupled to said beam on one side of said position for detecting the amplitude of the unbalance force generated by either of said wheels upon the selected rotation thereof.

References Cited
UNITED STATES PATENTS

| | | | |
|---|---|---|---|
| 2,383,405 | 8/1945 | Merrill et al. | 73—457 |
| 2,722,829 | 11/1955 | Ringering | 73—457 |
| 2,798,379 | 7/1957 | Merrill et al. | 73—457 |
| 3,164,994 | 1/1965 | Merrill et al. | 73—457 |

RICHARD C. QUEISSER, Primary Examiner

H. GOLDSTEIN, Assistant Examiner